INVENTORS.
Stewart L. Black
Theodore L. Hanson
Billie G. Nail
BY Hovey, Schmidt, Johnson & Hovey
ATTORNEYS.

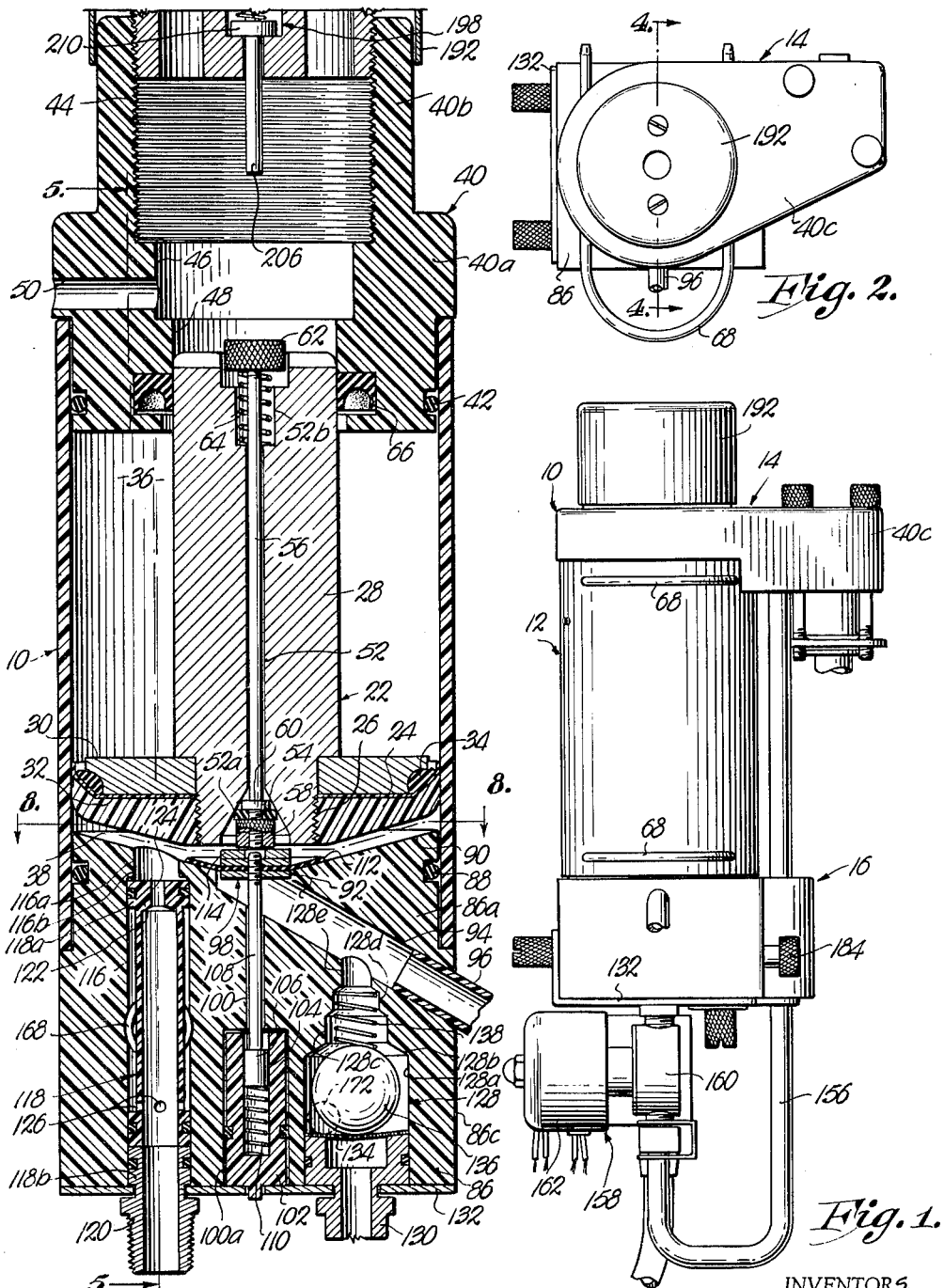

Dec. 28, 1965  S. L. BLACK ETAL  3,226,099
APPARATUS FOR PREPARING AND DISCHARGING WATER
HAVING CONTROLLED AMOUNTS OF CARBONATION
Filed May 7, 1962  6 Sheets-Sheet 3

INVENTORS.
Stewart L. Black
Theodore L. Hanson
BY Billie G. Nail
Hovey, Schmidt, Johnson & Hovey
ATTORNEYS.

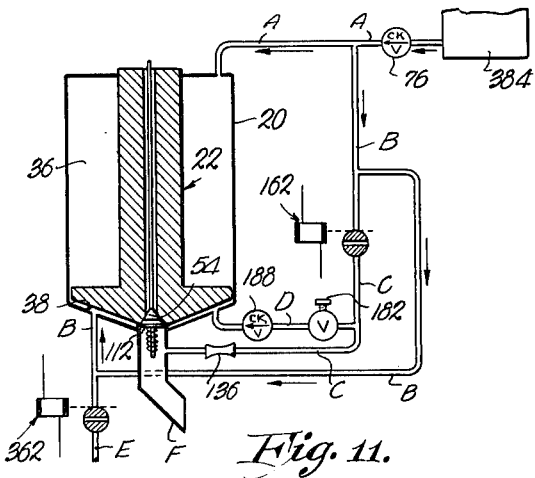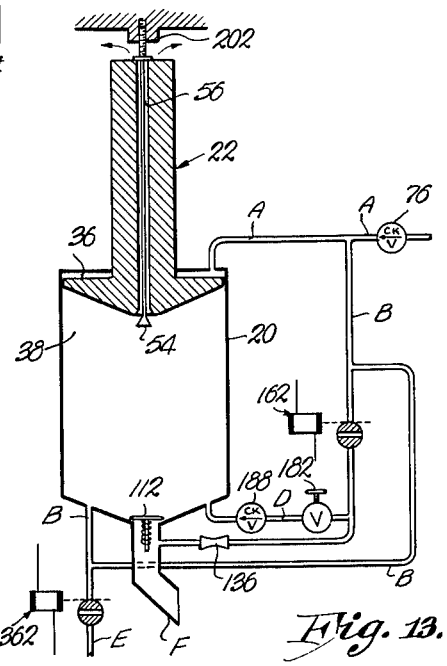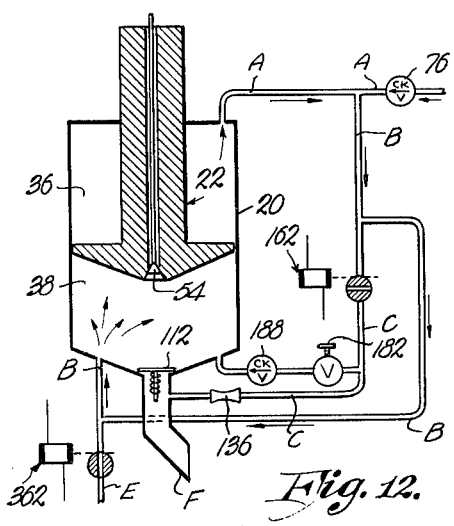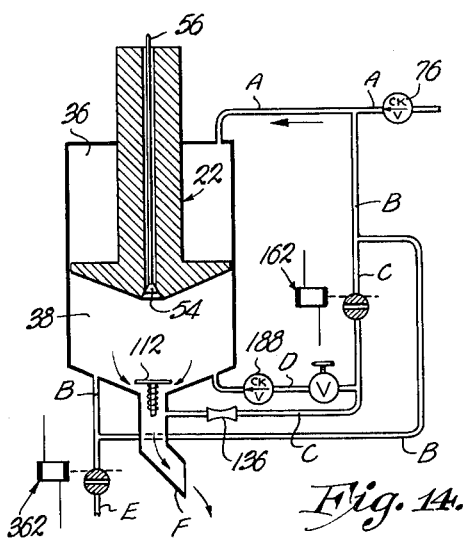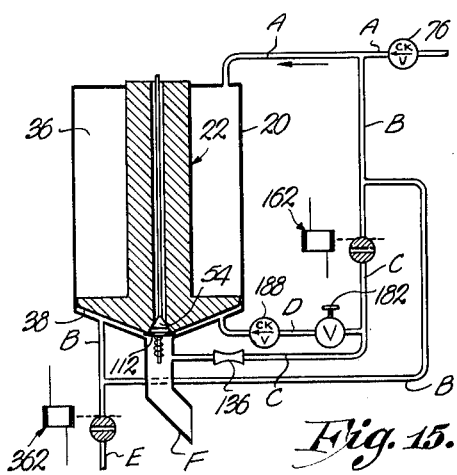

Dec. 28, 1965    S. L. BLACK ETAL    3,226,099
APPARATUS FOR PREPARING AND DISCHARGING WATER
HAVING CONTROLLED AMOUNTS OF CARBONATION
Filed May 7, 1962    6 Sheets-Sheet 5
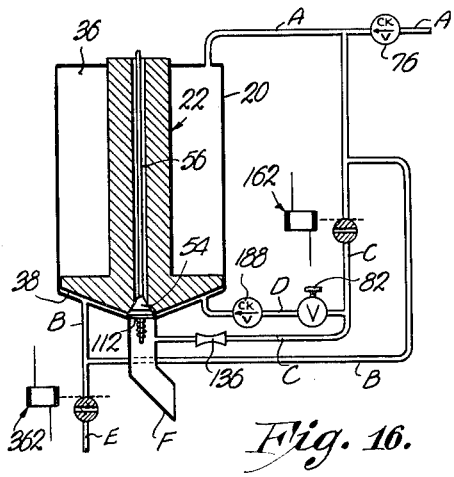
Fig. 16.
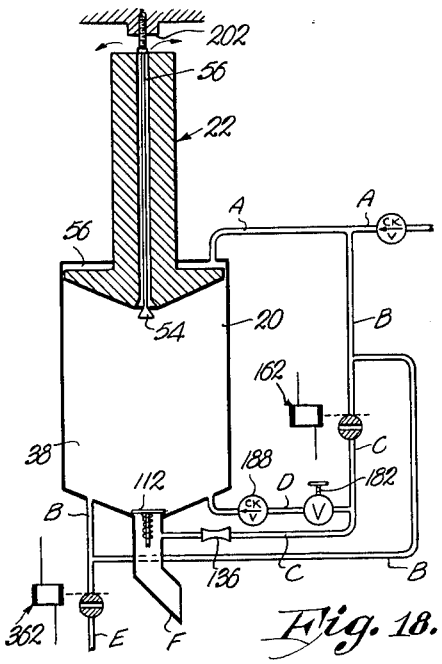
Fig. 18.
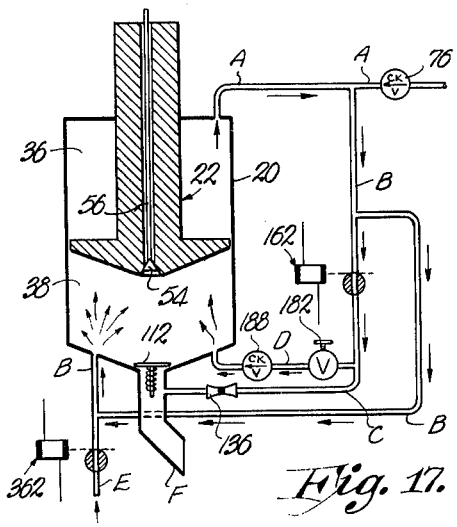
Fig. 17.
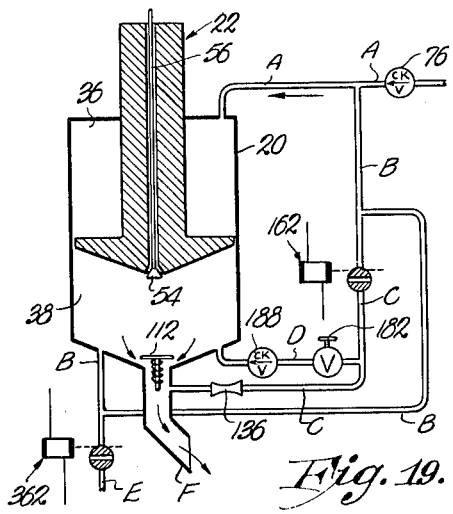
Fig. 19.
Fig. 20.
INVENTORS.
Stewart L. Black
Theodore L. Hanson
BY Billie G. Nail
Hovey, Schmidt, Johnson & Hovey
ATTORNEYS.

Dec. 28, 1965 S. L. BLACK ETAL 3,226,099
APPARATUS FOR PREPARING AND DISCHARGING WATER
HAVING CONTROLLED AMOUNTS OF CARBONATION
Filed May 7, 1962 6 Sheets-Sheet 6

INVENTORS.
Stewart L. Black
Theodore L. Hanson
BY Billie G. Nail

ATTORNEYS.

United States Patent Office 3,226,099
Patented Dec. 28, 1965

3,226,099
APPARATUS FOR PREPARING AND DISCHARGING WATER HAVING CONTROLLED AMOUNTS OF CARBONATION
Stewart L. Black, Independence, and Theodore L. Hanson and Billie G. Nail, Kansas City, Mo., assignors to The Vendo Company, Kansas City, Mo., a corporation of Missouri
Filed May 7, 1962, Ser. No. 192,764
11 Claims. (Cl. 261—35)

This invention relates to apparatus for carbonating water and particularly to a carbonating unit adapted to provide either highly carbonated, low carbonated, or plain water in single cup quantities for a beverage dispensing machine of the postmix type.

Sale of bottled beverages from vending machines has been carried out successfully for many years, but these machines have suffered from the primary inherent defect of restricted capacity requiring frequent stocking of the storage compartments of the machines, as well as the limited types or flavors of beverages that may be sold at one time from each unit. Major efforts to solve these problems have centered around vending machines for dispensing beverages into disposable cups, thereby materially increasing the total capacity of the vending machine and also avoiding the problem of containers such as cans or bottles for the drinks, which not only require considerable space in the machine and thereby limiting the capacity of the mechanism, but also presenting a container return problem when glass bottles are employed. Machines capable of delivering a beverage to a cup which the customer removes from the machine, have been either of the premix type wherein the syrup and carbonated or plain water are admixed and stored in the vending machine cabinet prior to introduction of a measured amount of the beverage into a cup accessible to the customer; or of the postmix type with the syrup and liquid being directed into the cup simultaneously from different sources in the machine. Each type of dispenser has advantages over the other with the premix type dispenser providing a more uniform drink under varying conditions of operation, while the postmix machine requires that the serviceman only replace the carbon dioxide tank and replenish the syrup compartments of the apparatus. Furthermore, the postmix machines normally can be set up to dispense a larger number of drinks than premix vendors prior to servicing and in a smaller space. For this reason, postmix machines have economic advantages over premix machines if beverages of satisfactory quality can be reproducibly dispensed from the apparatus.

Since it is desirable that a number of different types of beverages be delivered from the postmix type machine, it can be recognized that problems are encountered in providing required amounts of liquid for diluting the syrup directed into the cup at the dispensing station of the vending machine, because certain drinks require highly carbonated water, other beverages need low carbonated water, while other drinks are of the completely noncarbonated type wherein plain water is introduced into the cup. A further complicating factor is the necessity of employing carbonating equipment in the vending machine which occupies a minimum of space and yet is capable of delivering highly carbonated diluting water to the cup as long as syrup is available in the flavor supply tanks and at the normal dispensing rate of the machine. Another important problem has been to assure that the carbonated water delivered to the cup and whether of the highly carbonated or low carbonated type, be exactly the same for each drink so that customers are assured of purchasing beverages of required quality and as fast as the machine is capable of dispensing successive beverages.

More recently, it has been found to be commercially desirable to introduce a quantity of chipped ice into the cup along with syrup and diluting liquid, and this has further necessitated maintaining the components within the vending machine of a minimum size because of the ice making and dispensing unit which must be located in the machine above the cup station. The customer preferably has a choice as to whether or not to receive ice in his drink, and therefore the carbonating apparatus and liquid delivering mechanism must be capable of introducing different quantities of liquid into the cup depending upon whether ice is also directed thereinto by the ice making and dispensing unit.

In the most common postmix type beverage dispensing machine, a supply of carbonated water is prepared in a gas-liquid contact chamber and a quantity of such carbonated water maintained in the storage chamber at all times so that single cup amounts of the liquid may be delivered from the chamber during successive dispensing cycles of the machine. Such bulk storage of a carbonated water is disadvantageous because of the space required for the unit. The carbonating apparatus maintains the supply of carbonated liquid in the contact chamber at a predetermined level by conventional float valve control mechanism and the required water pressure for introducing water into the chamber in association with quantities of carbon dioxide, is obtained by employing a pump adapted to force liquid into the chamber at a level of about 150 p.s.i. Thus, the carbonating apparatus is relatively expensive, and control of the level of carbonation in the liquid is difficult to obtain under varying operating conditions because when drinks are dispensed from the machine at relatively infrequent intervals, the level of carbonation of the water in the storage chamber tends to increase thereby making the beverage more highly carbonated than desirable or in the alternative, causing excessive foaming of the liquid as the same is delivered into the cup.

It is therefore the primary object of the present invention to provide a carbonating unit for postmix type beverage vending machines that overcomes the problems outlined above and is capable of delivering measured amounts of either highly carbonated, low carbonated or plain water to a cup at a dispensing station of the machine and in association with flavoring syrup introduced into the beverage cup simultaneously with the diluting liquid.

Carbonators heretofore available, delivered water into a relatively still gas atmosphere using various means to obtain spraying or agitation of the water to achieve admixture with the gas. It is an important object of the present invention to improve the efficiency of the carbonating process by atomization of the water so that a specific level of carbonation can be obtained more quickly and under a lower gas pressure than formerly required. This is accomplished by novel means to spray the water into a high velocity carbon dioxide gas jet thus taking advantage of the energy inherent in the pressurized gas to break up the water into a fine mist for more efficient dissolving of the gas in the water.

Another significant object of the invention is to provide apparatus for preparing and discharging water having controlled amounts of carbonation which is designed to effect carbonation of only the amount of water which is delivered to a beverage cup at the dispensing station of the vending machine during each beverage vending cycle.

A further very important object of the invention is to provide single cup carbonating apparatus as described which is operable independently of the external water line pressure coupled to the vending machine, and obviating the utilization of expensive pumping units for raising the pressure of the supply water to high levels in order to obtain efficient carbonation of the water. An important collateral object is the provision of carbonating apparatus which does not employ high pressure pumps and thereby eliminating highly pressurized plumbing in the machine which presents safety problems and operating difficulties in predecessor beverage vending machines.

Also an important object of the invention is to provide a single cup carbonator which assures delivery of liquid of proper carbonation to each cup disposed at the dispensing station, regardless of the frequency of operation of the machine, because of the fact that a supply of carbonated liquid is not maintained in the machine at all times and with each quantity of carbonated liquid being prepared at the time of dispensing of the individual drink.

Another important aim of the invention is to provide apparatus of the type referred to above wherein the carbonated liquid, whether of high or low carbonation level, is delivered to the cup at the dispensing station of the machine, at a relatively low pressure to prevent foaming of the drink during filling of the cup which would lower the carbonation of the final beverage and cause the same to be of low quality.

A still further aim of the invention is to provide a single cup carbonator wherein the amount of liquid delivered to the cup may be varied as required to assure filling of the cup to a predetermined level regardless of whether ice is also introduced into the cup, or syrup and liquid alone delivered to the dispensing station.

Other objects and advantages of the present carbonating apparatus will be described in further detail or become obvious as the following specification progresses.

In the drawings:

FIGURE 1 is a side elevational view of one side of apparatus for preparing and discharging water having controlled amounts of carbonation therein, and with selectively operable stop mechanism forming a part of the structure and normally mounted on the top of the apparatus not being illustrated;

FIG. 2 is a plan view of the portion of the apparatus shown in FIG. 1;

FIG. 4 is an enlarged, fragmentary, vertical sectional view taken substantially on the line 4—4 of FIG. 2 and looking in the direction of the arrows, but with the cap on the cylinder structure shown in the generally uppermost operating position thereof;

Figure 23:
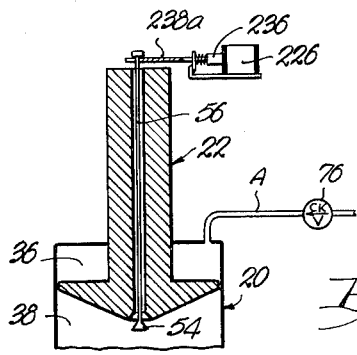
Figure 21:
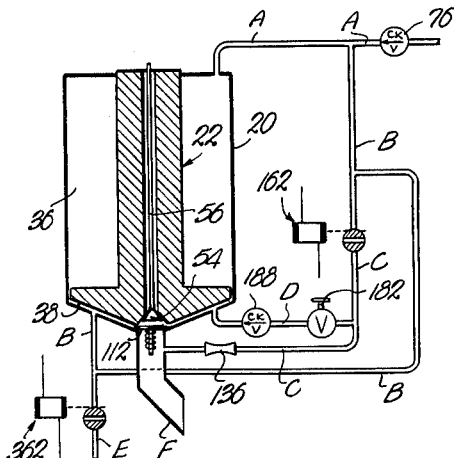
Figure 22:
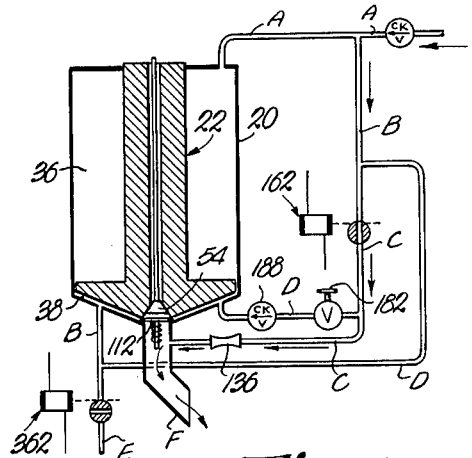
Figure 24:
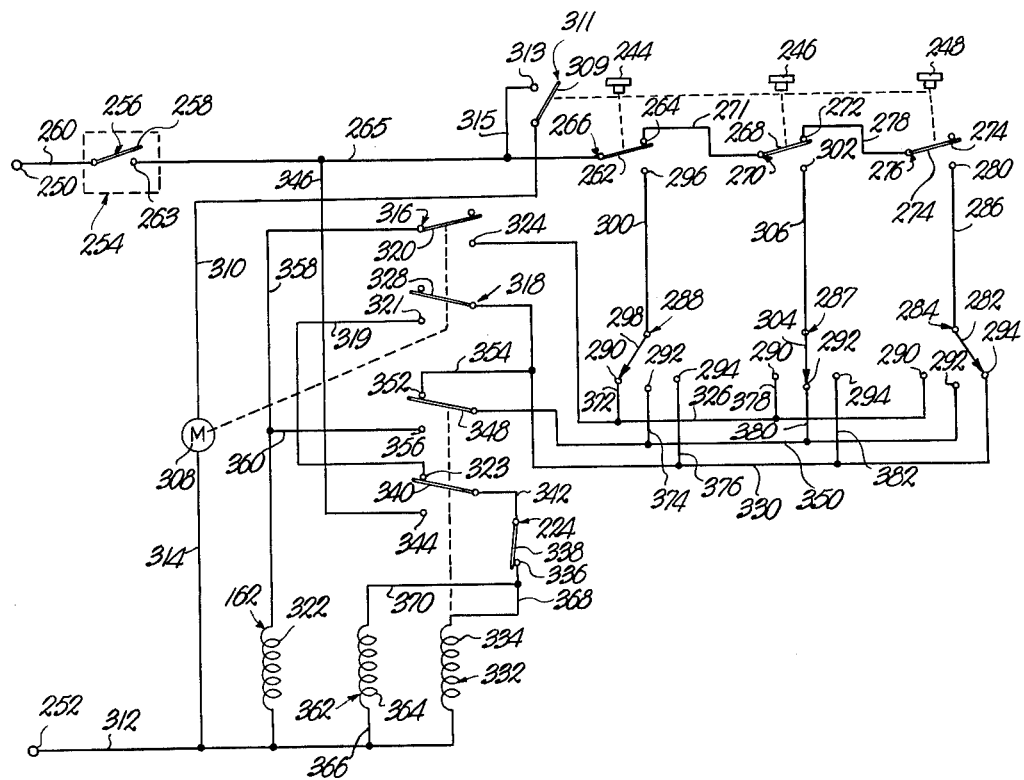

FIG. 11 is a schematic representation of the present carbonating apparatus and showing the components thereof in stand-by condition and with the direction of flow of liquid from the water supply line to one compartment of the carbonating chamber, and the direction of flow of liquid through an external conduit intercommunicating one compartment of the carbonating chamber with another compartment therein, being indicated by arrows;

FIG. 12 is a schematic representation of the apparatus and showing the flow of liquid and gas through the lines of the carbonating unit when a quantity of highly carbonated liquid is being prepared for ultimate discharge to the dispensing station of a vending machine;

FIG. 13 is a schematic view of the completion of the carbonating cycle in the production of highly carbonated liquid and illustrating the manner in which the pressure in the carbonating compartment is relieved to the atmosphere;

FIG. 14 is a schematic representation following from FIG. 13 and illustrating the manner in which highly carbonated liquid is discharged from the carbonating chamber in conjunction with introduction of additional plain water into the upper compartment of the chamber;

FIG. 15 is a schematic representation of the completion of the discharge of carbonated water from the carbonating chamber and showing completion of filling of the upper compartment of the carbonating chamber;

FIG. 16 is a schematic representation of the components in stand-by condition preparatory to production of carbonated liquid of low carbonation;

FIG. 17 is a schematic representation of the apparatus illustrating the flow paths of the different fluids and the location of the components of the unit during production of low carbonated liquid;

FIG. 18 is a schematic representation of the apparatus showing the location of the components at the completion of the low carbonation cycle;

FIG. 19 is a schematic representation of the components during discharge of low carbonated water from the carbonating chamber;

FIG. 20 is a schematic representation of the components at the completion of the low carbonated water dispensing cycle and showing the flow path of water as the same refills the upper compartment of the carbonating chamber;

FIG. 21 is a schematic representation of the components of the apparatus in stand-by condition preparatory to delivery of plain water to the dispensing station of the vending machine;

FIG. 22 is a schematic representation of the flow path of plain water through the carbonating apparatus and in by-passing relationship to the carbonating chamber of the unit;

FIG. 23 is a partial schematic representation of the carbonating apparatus and showing the way in which the selectively operable stop mechanism associated with the carbonating chamber is actuatable to vary the point at which the gas pressure is relieved in the carbonating chamber; and FIG. 24 is a schematic wiring diagram showing a simplified circuit for controlling operation of the carbonating unit for delivering either highly carbonated, low carbonated or plain water to any one of a number of dispensing stations forming a part of a vending machine.

Briefly, the present apparatus for preparing and discharging water having controlled amounts of carbonation comprises structure defining a cylindrical chamber receiving a shiftable piston therein provided with an enlarged stem thereon which extends out of one end of the chamber. An external conduit intercommunicates opposite ends of the chamber so that water in one compartment may pass via the external conduit into the other compartment on the opposite side of the piston when the latter is shifted from the initial location of the same at one end of the chamber, toward the opposite end of the cylinder structure. A carbon dioxide supply line communicates with the external conduit adjacent the inlet of the conduit to the carbonating chamber, and a low pressure water supply line is also connected to the external conduit in proximal relationship to the water outlet of the conduit leading from the other compartment of the cylindrical chamber and remote from the carbon dioxide supply line. During selective introduction of carbon dioxide into the carbonating chamber, the piston is shifted toward the opposite end of its path of travel and the liquid normally contained in the compartment on the opposite side of the piston, is caused to flow through the external conduit and back into the carbonating chamber in conjunction with the carbon dioxide gas, because of the differential pressures in the spaced compartments of the carbonating chamber by virtue of the fact that the effective area of the piston on the side thereof having the stem referred to above, is less than the effective surface area of the piston facing the carbon dioxide inlet to the cylindrical chamber.

After a predetermined amount of water has been delivered from the plain water compartment of the structure to the carbonating compartment of the chamber, the pressure in the chamber is automatically relieved and the carbonated water is discharged to the dispensing station of the vending machine. Low carbonated water is obtained by diverting a portion of the liquid passing through the external conduit intercommunicating opposed compartments of the carbonating chamber, directly into the carbonating compartment and in by-passing relationship to the carbon dioxide introduced into the chamber, whereby the by-passed water does not contact gaseous carbon dioxide. Plain water is delivered to the dispensing station of the machine by by-passing a predetermined quantity of water around the carbonating chamber and directly to the discharge passage of the apparatus.

Apparatus for preparing and discharging water having controlled amounts of carbonation and embodying the preferred concepts of the present invention is illustrated in the drawings and broadly numerated 10, with the basic components comprising centrally disposed cylinder structure 12, a head unit 14 mounted on the normally uppermost end of structure 12, a base assembly 16 operably mounted on the lower extremity of cylinder structure 12, and selectively operable stop mechanism 18 carried by head unit 14 in overlying relationship thereto. Although not detailed in the drawings, it is to be understood that apparatus 10 is mounted within the cabinet of a vending machine of the postmix type and preferably positioned adjacent the dispensing station of the vending unit. Thus, cup dropping mechanism as well as an ice making and dispensing unit are also located in proximal relationship to the dispensing station, and syrup supply means is provided within the cabinet for directing predetermined amounts of syrup to cups which are dropped to the dispensing station during each vending cycle. As will be explained hereinafter, it is to be preferred that the machine be of the multi-drink type for dispensing a number of different varieties of beverages including those of the highly carbonated, low carbonated and plain water type.

Structure 12 includes a cylinder 20 which is located in an upright position and slidably receiving a piston unit 22 mounted for shifting movement between opposed extremities of cylinder 20. As is best apparent from FIG. 4, piston unit 22 comprises a main disc-like piston body 24 substantially spanning cylinder 20 and provided with an internally threaded, central aperture 26 therein located on the axis of cylinder 20. An elongated, relatively long, cylindrical piston stem 28 is provided with a reduced section at one extremity thereof threaded into aperture 26 and serving to fixedly secure an annular retainer member 30 between piston body 24 and the annular downwardly facing shoulder of stem 28 defined by the lower reduced section thereof. Annular diaphragm 32 is clamped between piston body 24 and retainer member 30 and is of sufficient diameter to engage and to a limited extent overlie the inner cylindrical surface of cylinder 20. Circular element 34 of resilient material is also clamped between the outer margin of retainer member 30 and the peripheral lip of piston body 24 and is complementally received within a suitable annular recess therefor in piston body 24, it being noted from FIG. 4 that the lip portion of piston body 24 is provided with an upwardly facing, outwardly inclined surface in facing relationship to the flexible element 34 thereby causing the diaphragm 32 to assume a generally upwardly facing cup-shaped configuration. The piston body 24 serves to divide the carbonating chamber defined by cylinder 20 into an upper liquid compartment 36 and an initially smaller carbonating compartment 38 located below the lower surface of piston body 24. Since the relatively thick stem 28 limits the effective surface area of retainer member 30 in relationship to the downwardly facing surface of piston body 24, it can be seen that the liquid pressure in the compartments 36 and 38 will vary during shifting movement of piston unit 22 as will be explained in greater detail hereinafter.

The head unit 14 includes a synthetic resin body 40 provided with a depending, generally cylindrical lower segment 40a removably telescoped into the upper end of cylinder 20 and having O-ring means 42 thereon in sealing engagement with the inner surface of cylinder 20 to prevent leakage of fluid from compartment 36. The upper portion 40b of body 40 is also of generally cylindrical shape and is provided with a relatively large, centrally disposed, internally threaded aperture 44 in coaxial alignment with a somewhat smaller diameter bore 46 in the central section 40c of body 40, as well as with a cylindrical passage 48 in lower portion 40a of body 40 and complementally and slidably receiving the stem 28 of piston unit 22 as best shown in FIG. 4. The central section 40c of body 40 is of enlarged configuration with respect to portions 40a and 40b, as indicated in FIGS. 1, 2, 5 and 6, and the generally trapezoidal shape of this body presents an outwardly extending wing portion which serves as water inlet means and water by-passing structure as will be explained. It is to be pointed out however, as shown in FIG. 4, that central section 40c of body 40 is provided with a transverse passage 50 therein which serves to communicate bore 46 with the atmosphere.

In order to effect relief of the gas pressure in compartment 38 and cause excess gas to be exhausted to the atmosphere, stem 28 is provided with an elongated bore 52 therein extending the full length of piston unit 22 and communicating compartment 38 with bore 46 and thereby the atmosphere via passage 50. The lowermost portion 52a of bore 52 is flared to present a generally frusto-conical passage communicating directly with compartment 38. A flexible valve element 54 is mounted on the lowermost extremity of an elongated rod member 56 slidably positioned in bore 52 and extending the full length thereof, so that upon movement of rod member 56 in an upward direction, valve element 54 contacts the inner face of flared portion 52a of bore 52 to effect a fluid-tight seal therewith. Knurled keeper 58 threaded over the lower end of rod member 56 retains valve element 54 in engagement with an enlarged stop 60 on member 56 within the frusto-conical passage portion 52a of bore 52. The upper section 52b of bore 52 is enlarged to present a transversely T-shaped notch for receiving an enlarged pusher element 62 carried by the upper end of rod member 56, as well as a coil spring 64 within passage section 52b and engaging the pusher element 62 and the inner surface of stem 28 defining a portion of section 52b, to thereby effect biasing of the rod member 56 in a direction to force flexible valve element 54 into engagement with the surface of flared portion 52a of bore 52. A cup sealing ring 66 is carried by lower portion 40a of body 40 in surrounding relationship to passage 48 and in sealing contact with the outer surface of stem 28.

A generally U-shaped metal pin 68 extends through the side wall of cylinder 20 and also through the lower portion 40a of body 40 as shown in FIGS. 1, 2, 3 and 5, to releaseably secure body 40 to cylinder 20.

The outwardly extending wing portion of central section 40c of body 40 has a horizontal passage 70 therein extending into the central segment of section 40c and communicating with a vertical, transversely arcuate bore 72 which communicates directly with the compartment 36 through lower portion 40a of body 40. A short, upwardly extending passage 74 in the wing portion of central section 40c communicates with passage 70 and receives a check valve assembly broadly designated 76 for controlling flow of liquid into and out of passages 74, 70 and bore 72. An outer main tubular coupling 78 telescoped into passage 74 has a valve ball 80 therein, while a second, generally annular valve seat member is provided within the upper end of coupling 78 and thereby within passage 74 and serves to support a second valve ball 84. It can be seen from FIG. 5 that the valve balls 80 and 84 serve to prevent flow of liquid outwardly of coupling 78 but do not interfere with inflow of liquid. The check valve assembly 76 is removably mounted on central section 40c of body 40 for cleaning purposes and to permit ready replacement of parts. Since the water supply line for apparatus 10 is coupled to check valve assembly 76, and such water supply line is normally of copper tubing, a pair of valve balls are provided in assembly 76 to absolutely preclude passage of carbonated water into the copper water supply line. In this manner, formation of toxic copper carbonates is obviated.

Figure 8:
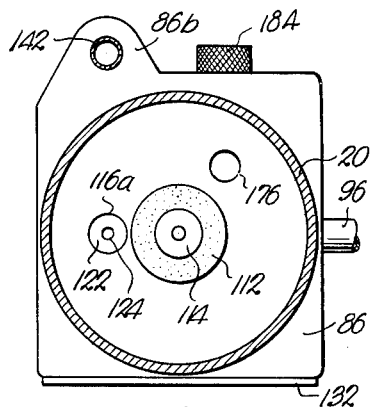
FIG. 8 is a reduced cross-sectional view taken substantially on the irregular line 8—8 of FIG. 4.
Figure 6:
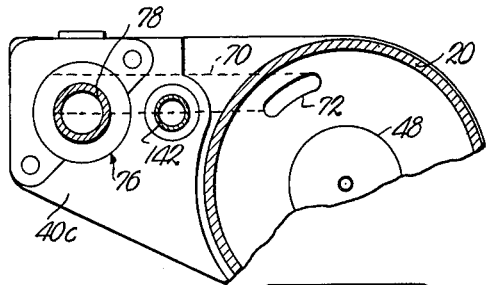
FIG. 6 is a fragmentary, horizontal cross-sectional view taken substantially on the line 6—6 of FIG. 5 and looking upwardly in the direction of the arrows.
Figure 3:
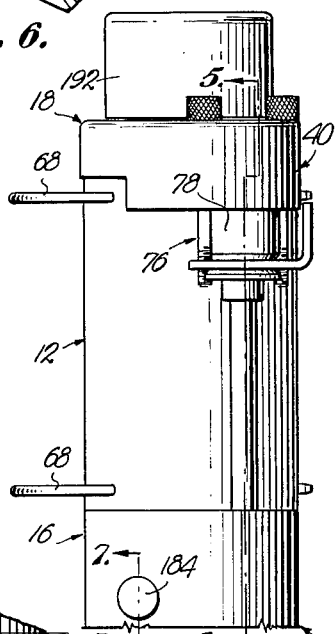
FIG. 3 is a partial side elevational view of another side of that portion of the apparatus illustrated in FIG. 1.
Figure 5:
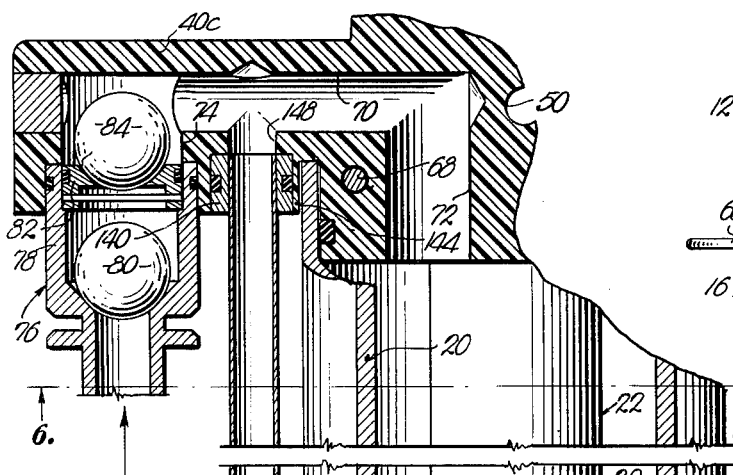
FIG. 5 is an enlarged, fragmentary, vertical cross-sectional view taken substantially on the lines 5—5 as indicated in FIGS. 3 and 4.

The base assembly 16 comprises a synthetic resin block 86 removably mounted on the lower extremity of cylinder 20 and having a number of passages therein for effecting direction of fluids to specific areas as will become apparent hereinafter. As shown in FIGS. 4, 5 and 8, block 86 is of generally rectangular configuration and is provided with an upwardly extending, generally cylindrical top portion 86a removably telescoped in the lower end of cylinder 20, as well as an upright side extension 86b underlying the wing portion of central section 40c of body 40. O-ring means 88 carried by top portion 86a of block 86 in surrounding relationship to the outer surface of portion 86a, frictionally engages the inner face of cylinder 20 to prevent leakage of fluid out of compartment 38.

As is best shown in FIGS. 4 and 5, the upwardly facing surface 90 of top portion 86a of block 86 is of generally frusto-conical, cup-shaped configuration and cooperates with the lower face of piston body 24 and the side wall of cylinder 20 to define the carbonating compartment 38. The lower face of piston body 24 is preferably configured to substantially complementally conform to surface 90 of block 86. Surface 90 of top portion 86a of block 86 is provided with a central opening 92 therein communicating directly with an angularly disposed bore 94 (FIG. 4) in body 86 and extending to the side wall 86c of block 86. A carbonated water discharge tube 96 telescoped into bore 94 is adapted to terminate in direct overlying relationship to the dispensing station of the vending machine receiving apparatus 10 whereby carbonated water from compartment 38 will be directed into a cup at the vend station. Valve means broadly designated 98 is mounted on block 86 for controlling flow of water out of the compartment 38 through the opening 92. A vertical bore 100 in block 86 and coaxial with opening 92 has an enlarged lower portion 100a that receives a removable plug 102 having a central, upwardly opening, transversely polygonal passage 104 therein serving to slidably receive the polygonal base member 106 carried by valve stem 108 reciprocable in the narrow portion of bore 100. Coil spring 110 within passage 104 between the lower extremity of plug 102, and the base member 106, serves to bias valve stem 108 in an upward direction toward compartment 38. A flexible diaphragm element 112 carried by the upper end of valve stem 108 through washer and keeper means 114, is of greater diameter than opening 92 so as to effect closing of the latter when the valve stem 108 is at the lower end of its path of travel. When the piston unit 22 is at the lower end of its path of travel as shown in FIG. 4, the keeper 58 engages washer and keeper means 114 on valve stem 108 to thereby force the flexible diaphragm element 112 into engagement with the upper surface 90 of body 86 to effect closing of opening 92.

Means for supplying carbon dioxide to the carbonating chamber 38 includes a vertical bore 116 in block 86 and extending the full height thereof, although it is to be noted that the upper section 116a of bore 116 and communicating with compartment 38 through the surface 90 of block 86, is of somewhat less diameter than the main length of bore 116 to present a downwardly facing annular shoulder 116b. A tubular water and carbon dioxide mixing member broadly designated 118 is removably mounted in bore 116 and is in engagement with the shoulder 116b so that when the tubular gas line coupling 120 is telescoped into the lower end of bore 116, the mixing member 118 is clamped between shoulder 116b and the inner end of coupling 120. The upper extremity of mixing member 118 has a cross wall 122 adjacent shoulder 116b and provided with a restrictive central orifice 124 therethrough of substantially less diameter than the internal diameter of tubular member 118. As is shown in FIGS. 4 and 5, the outer surface of member 118 is in spaced relationship to the inner face of block 86 defining bore 116, but enlarged annular segments 118a and 118b integral with member 118 complementally engage the side walls of bore 116 and maintain member 118 centrally disposed in such bore. Four openings 126 are provided in the side wall of member 118 immediately above segment 118b and serve to communicate the interior of member 118 with bore 116.

An external by-pass conduit is provided on apparatus 10 for communicating compartment 36 with bore 116 and thereby carbonating compartment 38.

Another irregularly configured, substantially vertical bore 128 is provided in block 86 with the main section 128a thereof being adapted to receive a tubular coupling member 130 partially telescoped into body 86 and maintained therein by the lower leg of a generally L-shaped metal plate 132 which also releasably secures coupling 120 in bore 116 and maintains the plug 102 in enlarged portion 100a of bore 100. The slots in plate 132 for receiving coupling 120 and member 130 are of generally keyhole configuration to permit removal of the components from the plate. The inner annular end of coupling member 130 supports a circular screen 134 which in turn carries a relatively large valve ball 136 located for movement vertically in the bore 128. As shown in FIG. 4, the frusto-conical segment 128b of bore 128 cooperates with the cylindrical portion 128c of reduced diameter relative to main section 128a, to present a valve seat for valve ball 136 and thereby precluding passage of liquid through bore 128. A coil spring 138 within cylindrical portion 128c bears against ball 136 as well as a shoulder defined by the upper section 128d of bore 128 to bias ball 136 away from seat 128b. The uppermost cylindrical portion 128e of bore 128 communicates directly with the bore 94 in block 86.

As shown in FIG. 5, the lower surface of the wing portion of central section 40c of body 40, and the upper surface of the side extension 86b of block 86, are provided with aligned apertures 144 and 146 therein adapted to receive corresponding annular members 140 which in turn telescopically receive opposed ends of an elongated metal conduit 142 extending between section 40c and block 86. O-ring means are provided on members 140 to provide an effective seal between members 140 and the surfaces of section 40c and block 86 defining apertures 144 and 146. The aperture 144 communicates with passage 70 via bore 148 in central section 40c of body 40, while aperture 146 is aligned with a vertical passage 150 in block 86 and extending entirely through the side extension 86b thereof. A tubular coupling member 152 telescoped into an aperture 154 in the lower surface of block 86 and communicating with passage 150, serves to connect one end of a flexible U-tube to side extension 86b, while the opposite end of tube 156 is connected to selectively operable control valve mechanism broadly designated 158. The valve body 160 of mechanism 158 is releasably connected to coupling member 130, while tube 156 is also removably joined to the lower end of body 160 as best shown in FIG. 1. A solenoid 162 carried by body 160 has a shiftable armature which is operably joined to the valve within body 160 for permitting selective control of flow of liquid from tube 156 into bore 128.

A generally horizontal bore 164 (FIG. 5) traversing block 86 intercommunicates the bore 116 and passage 150 with the portion 164a of bore 164 adjacent passage 150 being of somewhat reduced diameter to present a valve seat for a check valve ball 166 located in bore 164. Tubular member 168 located in bore 164 between ball 166 and mixing member 118, bears against the outer surface of member 118 and serves as a stop for one end of a coil spring 170 which biases check ball 166 toward the location thereof in engagement with the valve seat defined by portion 164a of bore 164.

Figure 7:
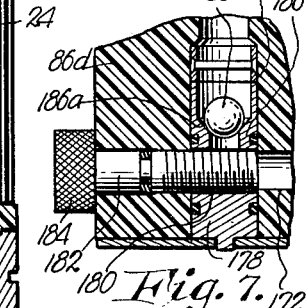
FIG. 7 is an enlarged, fragmentary, vertical sectional view taken on the line 7—7 of FIG. 3.

A second horizontal passage 172 through block 86 extends from the side wall 86d thereof across block 86 and into direct communication with main section 128a of bore 128. (See FIGS. 4 and 7.) A vertical bore 174 in block 86 traverses passage 172 and extends upwardly from the bottom of block 86 into communication with the interior of compartment 38 through aperture 176 in surface 90 of block 86 (FIG. 8). A cylindrical plug 178 fitted into the lower portion of vertical bore 174, is provided with a horizontal passage 180 therethrough in alignment with passage 172 and adapted to receive the inner extremity of an adjustment screw 182 threaded into the outer end of passage 172. The knurled knob 184 of screw 182 and located externally of said wall 86d of block 86 permits manual adjustment of screw 182 in passage 180. The plug 178 is also provided with a vertical bore 186 therein communicating bore 174 in block 86, with the horizontal passage 180 in plug 178 and with the inner surface of bore 186 being of irregular configuration to present a valve seat 186a for the check valve ball 188.

The block 86 is also removably connected to cylinder 20 by a generally U-shaped pin 68 which extends through the lower portion of cylinder 20 as well as the top portion 86a of block 86.

Figure 10:
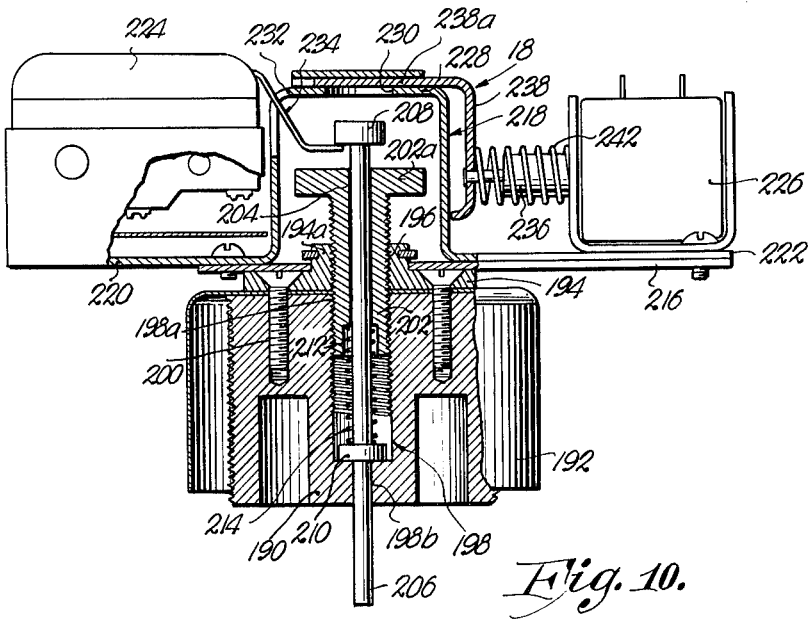
FIG. 10 is a fragmentary, vertical cross-sectional view taken on the irregular line 10—10 of FIG. 9 and looking in the direction of the arrows.

The head unit 14 includes a synthetic resin, generally cylindrical top plug 190 having threads on the outer cylindrical surface thereof adapted to complementally engage the internally threaded aperture 44 of body 40. A generally cup-shaped, downwardly opening metal cap 192 is mounted on plug 190 and is of a transverse diameter to complementally engage the outer cylindrical surface of upper portion 40b of body 40. A mounting plate 194 provided with a central bore 196 therein is disposed over the top of cap 192 in axial alignment with an elongated vertical passage 198 through plug 190. A series of fasteners 200 serve to releasably secure the plate 194 and the cap 192 on plug 190. As indicated in FIGS. 4 and 10, mounting plate 194 has an upstanding, centrally disposed boss portion 194a and the bore 196 of boss portion 194a as well as the plate 194 is internally threaded to complementally engage the external threads of an adjustment screw 202 which extends through boss 194a and is also complementally threaded into the enlarged, threaded section 198a of passage 198 in plug 190. The knurled head portion 202a of screw 202 facilitates rotation of the latter without the utilization of tools. The lowermost section 198b of passage 198 is of substantially less diameter than section 198a and is aligned with an elongated bore 204 extending longitudinally through screw 202 and thereby adapted to receive an elongated rod 206 that serves as an adjustable stop for the rod member 56. The circular head 208 on the uppermost end of rod 206 is positioned above head portion 202a of screw 202, while a circular flange 210 intermediate the ends of rod 206 is located within section 198a of passage 198 and adjacent the section 198b thereof. The lower extremity of screw 202 is provided with a relatively short, axially disposed recess 212 therein for receiving one end of a coil spring 214 which also bears against the upper face of flange 210.

A plate 216 carried by mounting plate 194 in overlying relationship thereto, receives a generally U-shaped bracket 218 having an outwardly extending leg 220 mounting a microswitch 224, as well as another outwardly projecting leg 222 which mounts a solenoid 226. The central U-shaped segment 228 of bracket 218 has an aperture 230 therein for clearing head 208 on rod 206, as well as a side opening 232 which clears the switch operating arm 234 of microswitch 224. It is to be noted that the outer extremity of arm 234 is in disposition underlying head 208 for opening and closing of switch 224 in response to reciprocation of rod 206.

Figure 9:
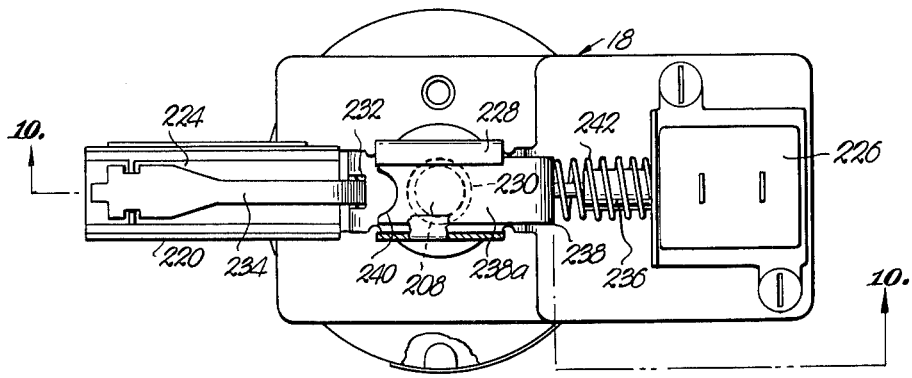
FIG. 9 is a plan view of a portion of the apparatus and showing the stop mechanism normally mounted on the upper portion of the carbonating unit and which was not illustrated in FIG. 1, certain parts being broken away for clarity of the components therebeneath.

The retractable armature 236 of solenoid 226 is connected to a generally L-shaped stop member 238 having an upper horizontal leg 238a which normally overlies the bight of segment 228 as illustrated in FIG. 9. The outer end of stop member 238 has a circular notch 240 therein for clearing head 208 when armature 236 is retracted upon energization of the coil of solenoid 226. The coil spring 242 surrounding armature 236 normally maintains the latter in the outer disposition thereof as illustrated in FIG. 10.

A simplified circuit for operating apparatus 10 is illustrated in FIG. 24 of the drawings and to clearly show the manner in which high carbonated, low carbonated or plain water may be vended from a single machine employing apparatus 10, three separate push buttons have been shown in FIG. 24 with each corresponding to a different type of beverage. For example, the push button 244 is set up in the illustrative circuit to control delivery of a product having plain water therein, while the push button 246 controls delivery of a low carbonated beverage to the customer and push button 248 is set to effect delivery of a highly carbonated beverage to the dispensing station. In the representative circuit, the power terminals 250 and 252 are adapted to be connected to a suitable source of alternating current and in order to prevent complication of the circuit with conventional components, coin controlled mechanism broadly designated 254 is indicated by a dotted line box having a switch 256 therein which effects actuation of the apparatus 10 upon closing of a switch 256 in a known manner. Thus, the switch arm 258 of switch 256 is connected to terminal 250 by line 260 while the contact 263 of switch 256 is joined to the switch arm 262 associated with push button 244, by a line 265. In order to prevent operation of more than one of the push buttons 244, 246 or 248 at a time, the switches associated therewith are connected in series, and therefore the contact 264 of switch 266 operated by push button 244, is connected to the switch arm 268 of switch 270 operated by push button 246, by a line 271. The contact 272 of switch 270 is coupled to the switch arm 274 of the remaining push button operated switch 276 by line 278. The normally open contact 280 of switch 276 is connected to the manually adjustable switch arm 282 of selector switch 284 by line 286. Selector switches are provided for each of the push buttons 244, 246 and 248 and thus selector switch 287 is associated with switch 270 while selector switch 288 is operably joined to switch 266. Each of the selector switches 284, 287 and 288 is provided with a plain water contact 290, a low carbonated water contact 292 and a high carbonated water contact 294. Thus, completing the circuits of switches 266 and 270, it is to be noted that the normally open contact 296 of switch 266 is joined to the manually adjustable switch arm 298 of switch 288 by line 300, and the normally open contact 302 of switch 270 is connected to the manually adjustable switch arm 304 of switch 287 by line 306.

The field windings of a cam motor 308 are connected to the switch arm 309 of switch 311 by line 310 and to a line 312 leading from power terminal 252, by line 314. The contact 313 of switch 311 is joined to line 265 and switch arm 309 is mechanically linked to push buttons 244, 246 and 248 for closing by actuation of any of the latter so that motor 308 will be actuated upon simultaneously closing of switch 256 and any one of the switches 266, 270 or 276. The shaft of motor 308 has a series of cams thereon for operating a pair of switches 316 and 318. The water switch 316 has a switch arm 320 coupled to the coil 322 of water solenoid 162 while the normally open contact 324 of such switch is connected to contact 290 of switch 284 by a line 326. The carbon dioxide switch 318 is provided with a switch arm 328 connected to contact 294 of switch 284 by line 330. Contact 321 of carbon dioxide switch 318 is connected to contact 323 of relay 332 by a line 319. The relay 332 employed in conjunction with the cam motor 308, has a coil 334 coupled directly to the line 312. The other side of coil 334 is connected to the contact 336 of the carbon dioxide limit switch 224. The switch arm 338 of limit switch 224 is joined to the relay switch arm 340 of relay 332 by line 342. The normally open contact 344 of relay 332 associated with switch arm 340 is joined to power line 265 by line 346. The other switch arm 348 of relay 332 is connected to contact 292 of switch 284 by line 350. The normally closed contact 352 of relay 332 associated with switch arm 348 is connected to line 330 by a line 354. The opposed, normally open contact 356 operably associated with switch arm 348, is connected to the line 358 joining switch arm 320 and coil 322, by line 360. A carbon dioxide control valve solenoid 362 has a coil 364 connected to line 312 by a line 366, and to line 368 joining contact 336, by line 370. Although shown only schematically in the drawings, it is to be understood that the carbon dioxide supply line connected to coupling 120 has a valve therein under the control of solenoid 362 and similar to the solenoid control valve 158 in the external water by-pass conduit of apparatus 10.

The contact 290 of switch 288 is connected to line 326 by a line 372 while the contacts 292 and 294 of this same switch are joined to lines 350 and 330 respectively by lines 374 and 376. The contacts 290, 292 and 294 respectively of switch 287 are connected to lines 326, 350 and 330 by lines 378, 380 and 382.

*Operation*

In order to simplify the description of the operation of apparatus 10, a number of schematic representations of the disposition of the components to effect delivery of different types of water to the dispensing station of the machine, have been set forth in FIGS. 11 to 23 inclusive. Although the major physical parts of the mechanism as illustrated in the other drawings, are denominated with the same numbers in the schematic representations, the water and gas flow lines have been represented by letters of the alphabet to avoid repetition of citation of numbers during tracing of the flow paths of the various fluids as the operation of apparatus 10 is described through a complete cycle. For reference purposes, the line A leads from a water supply tank 384 within the vending machine cabinet and is connected directly to coupling 78 of check valve assembly 76. Thus, the conduit A includes the passage through check valve assembly 76, passage 70 and bore 72 leading into the compartment 36 of cylinder structure 12. It should be explained at this juncture that the water supply tank 384 contains a quantity of water maintained at a predetermined level therein by a conventional float valve unit. The water in tank 384 is not under pressure and water simply gravitates into compartment 36 under the head of liquid within tank 384. Check valve assembly 76 permits flow of water through the various passages into compartment 36, but precludes reverse flow of such fluid as is obvious from the disposition of balls 80 and 84 in coupling 78.

The external by-pass conduit B of the schematic representations in FIGS. 11 to 23 inclusive, includes conduit 142 leading from bore 148 communicating with passage 70, the passage 150 in block 68, bore 164, tubular mixing member 118, and bore 116 leading into compartment 38 through the opening in surface 90 of block 68. The conduit designated E is connected directly to the coupling 120 so that gas from the carbon dioxide source of supply will flow directly into the interior of mixing member 118.

The by-pass line C extends from passage 150 and includes the coupling 152, U-tube 156, the valve body 160, bore 128 and the water discharge tube 96. The second water by-pass line designated D leads from bore 128 in block 68 and includes the passage 172, passage 180 in plug 178, the vertical bore in plug 178, and the bore 174 in block 68 that communicates with compartment 38 via aperture 176.

It is initially assumed that the customer desires to obtain a highly carbonated beverage from the vending machine and the operation of apparatus 10 in dispensing highly carbonated water into the beverage cup at the filling station of the machine, is illustrated in FIGS. 11 to 15 inclusive. As shown in FIG. 11, water from storage tank 384 flows into the upper compartment 36 of cylinder 20 through line A and past the check valve assembly 76. The storage tank 384 preferably contains at least a quantity of water to effect complete filling of compartment 36 when piston unit 22 is at the lower end of its path of travel and therefore water is directed into compartment 36 under a head of not more than 2 or 3 p.s.i.

The customer deposits proper coinage in the machine corresponding to the price of the beverage to be purchased, whereupon the switch arm 258 is moved into engagement with contact 263 thereby setting up a circuit for the cam motor 308 upon closing of switch 311 and one of the selector switches 266, 270 or 276. In the schematic diagram of FIG. 24, the manually adjustable switch 284 is in a condition with the switch arm 282 thereof in engagement with the high carbonated water contact 294, and therefore the vending machine cabinet will have an identification on the front thereof indicating that actuation of the push button 248 will result in dispensing of a highly carbonated beverage from the unit. Thus, when the customer depresses push button 248, switch arm 274 is shifted into engagement with contact 280 along with closing of switch 311 thereby completing the circuit to cam motor 308 through a circuit traced by terminal 250, line 260, switch arm 258, contact 263, line 265, line 315, contact 313, switch arm 309, line 310, the field windings of motor 308, line 314, line 312 and terminal 252. It is to be understood that the cam motor 308 may in actual practice be the cup dropper motor of the vending machine whereby energization thereof is maintained for a predetermined interval and effects dropping of a cup to the dispensing station for receiving syrup and carbonated liquid as will be explained.

Upon energization of the motor 308, the cams on the shaft thereof effect closing of switches 316 and 318 whereby a circuit is completed to the relay 332. Since the switch arm 328 of switch 318 has been moved into engagement with contact 321, a circuit from closed switch 276 may be traced through line 286, switch arm 282, high carbonated water contact 294 of switch 284, line 330, switch arm 328, contact 321, line 319, contact 323, switch arm 340, line 342, switch arm 338 of limit switch 224, contact 336, line 368, coil 334 of relay 332, line 312 and terminal 252. The coil 364 of carbon dioxide control valve solenoid 362 will also be energized from line 368 through line 370, the windings of coil 364 and line 366 joined to line 312. However, the holding circuit for solenoid 362 is established through line 265, line 364, contact 344, relay switch arm 340 which has been moved into engagement with contact 344 upon energization of coil 334, line 342, the closed limit switch 224, and line 370 as previously described. The relay 332 and carbon dioxide control solenoid 362 will remain energized until opening of the carbon dioxide limit switch 224 as will be clear hereinafter.

Upon energization of the solenoid 362, the valve thereof in line E is moved to an open position as indicated in FIG. 12 whereby carbon dioxide under pressure is permitted to pass through line E into the line B for entrance into compartment 38 of cylinder 20. Although the pressure of the carbon dioxide at the source thereof may vary within certain limits, it is to be preferred that such pressure be within the range of 60 to 80 p.s.i. Thus, the carbon dioxide entering the mixing member 118 is under relatively high pressure and thereby moving at a high velocity, and is forced to pass through the restricted orifice 124 before enternig the chamber of cylinder 20 below piston unit 22. As the carbon dioxide flows into compartment 38, the pressure thereof against the lower surface of piston body 24 causes unit 22 to be shifted upwardly as illustrated in FIG. 12. During upward movement of piston unit 22, water from compartment 36 is caused to flow through line A, and thence into line B because of the check valve assembly 76 located in line A downflow from the junction of lines A and B. The water flows through line B and is mixed with the carbon dioxide from the source thereof, within mixing member 118. As is apparent from FIGS. 4 and 5, the water passes into bore 164 and past the check valve ball 166 for passage into bore 116 via the tubular member 168. The water flows down and around the outer surface of mixing member 118 and is injected at relatively high pressure and in the form of a plurality of jest, directly into the gas stream flowing into the inlet of member 118. In this manner, very thorough mixing of the water and gas is obtained and efficient dissolving of the carbon dioxide in the water results prior to passage of the admixture into the interior of compartment 38.

The check valve ball 188 is forced downwardly against the seat thereof by water and carbon dioxide from compartment 38, and therefore escape of liquid from cylinder 20 is prevented through bore 174. By the same token, the pressure of the gas and liquid in compartment 38 forces the flexible element 112 downwardly into tight engagement with the upper surface 90 of block 68 and against the action of coil spring 110, to preclude leakage of fluid from compartment 38 through the discharge tube 96. Water from compartment 36 is forced therefrom and into compartment 38 via conduits A and B because of the difference in pressure on the liquids in the upper and lower compartments. For example, assuming a pressure within compartment 38 of about 80 p.s.i. because of the pressure of the gas forced into cylinder 20 from the carbon dioxide source, the pressure on the water within compartment 36 may be about 95 p.s.i. inasmuch as the surface area of retainer member 30 facing upwardly and defining the lower portion of compartment 36, is less than the corresponding downwardly facing area of piston body 24. The pressures calculated above are on the basis that the lower face of piston unit 22 has an area of about six square inches whereas the upwardly facing surface of the piston unit is about five square inches. Thus, notwithstanding the high pressure in compartment 38 produced by the carbon dioxide forced thereinto, the water in compartment 36 will be forced into compartment 38 against the gas pressure because of the higher pressure on the liquid in compartment 36.

The piston unit 22 will continue to move upwardly as the water is diverted from the compartment 36 into compartment 38, until the pusher element 62 on rod member 56 engages the lower extremity of rod 206 thereby shifting the latter in an upward direction against the action of coil spring 214. Since the solenoid 226 is in a deenergized condition, the outer portion 238a of stop member 238 will be positioned in overlying relationship to the aperture 230 and therefore upward movement of the rod 206 is discontinued upon engagement of head 208 with the undersurface of stop 238. When this occurs, the stem 28 and piston body 24 of piston unit 22 continue to move upwardly but the rod member 56 is stopped from further movement, thereby effecting opening of the valve element 54 as the latter moves out of engagement with the lowermost surface 52a of bore 52. The compartment 38 is thus vented to the atmosphere through bore 46 and the passage 50 and relieving the gas pressure in compartment 38. As soon as the pressure is relieved, the spring 110 forces valve stem 108 upwardly to open the carbonated liquid discharge valve 112 and permit the carbonated liquid to flow through bore 94 and the discharge tube 96 into a cup positioned at the dispensing station of the machine.

Immediately upon relieving of the pressure in compartment 38, the piston unit 22 discontinues further movement in an upward direction and commences to move downwardly (FIG. 14) as water from the tank 384 flows into compartment 36 via line A and through the check valve assembly 76. Downward movement of piston unit 22 also results in reclosing of valve 54 under the action of spring 64. The weight of the water entering compartment 36 assists in moving piston unit 22 downwardly to force carbonated liquid from compartment 38. It is important to recognize that the water discharged from compartment 36 is highly carbonated because of the manner in which the water from compartment 36 is intimately admixed with the carbon dioxide from the source thereof, prior to introduction of the admixture into the carbonating compartment 38.

Also, the operation described above is for discharge of a quantity of water into the dispensing cup corresponding to the amount needed for a beverage where ice in crushed form is also directed into the cup in association with the syrup. Thus, the amount of carbonated water introduced into the cup is somewhat less than would be the case if ice was not also delivered to the cup, because of the volume of the cup taken up by the crushed ice. The schematic representations in FIGS. 11 to 15 do not attempt to show the true relationship of the piston unit 22 in the cylinder 20 to cause a lesser quantity of water to be delivered to the vend cup because of ice introduced thereinto.

If the customer desires to obtain a drink without ice therein, a separate button is provided on the front panel of the machine with the designation that the button should be depressed for a drink without ice. This structure is not illustrated in the schematic diagram of FIG. 24 but is indicated generally in FIG. 23. It is to be understood that the switch is in series with a relay operably associated with solenoid 226 to effect energization of the latter upon closing of the "Without Ice" switch. When the armature 236 is retracted into the coil of solenoid 226 against the action of spring 242, the stop member 238 is shifted to the right viewing FIG. 9 and out of the path of travel of head 208 on rod 206 so that the latter may continue upwardly until the coil spring 214 is completely compressed or the flange 210 engages the lower extremity of screw 202. As soon as the rod 206 discontinues further upward movement, the compartment 38 is vented to the atmosphere as previously described and carbonated water is discharged into the cup. It can be seen that under these conditions of operation, a greater quantity of water will be delivered to the dispensing station from compartment 38, since a larger amount of water is transferred from compartment 36 into compartment 38 through the external by-pass conduit designated by letters A and B.

Returning to the description of the schematic circuit ilustrated in FIG. 24, it is also to be noted that during upward movement of the rod 206 under the influence of piston unit 22, the switch arm 234 of microswitch 224 is permitted to shift upwardly and as soon as the head 208 engages member 238, the switch arm 338 of switch 224 will move out of engagement with contact 336 to thereby break the circuit to relay 332 and coil 364 of carbon dioxide cylinder 362. In this manner, flow of carbon dioxide to compartment 38 is discontinued and waste of the gas is precluded. The cams on motor 308 will have already shifted the switch arm 348 and 328 back into the initial dispositions thereof as shown in FIG. 24 and thus the coil 334 of relay 332 will remain deenergized upon reclosing of limit switch 224 as the rod 206 moves downwardly during return movement of piston unit 22 to the lowermost end of its path of travel. The machine is now in condition for another vending cycle and of any type drink.

Manual adjustment of the disposition of screw 202 in plug 190 alters the point at which compartment 38 is vented to the atmosphere and thereby permitting selective variation of the amount of carbonated water delivered to the cup during a "No Ice" vend cycle. The total amount of water directed into compartment 38 for carbonation purposes may also be adjusted by rotating the plug 190 with respect to body 40 to alter the relationship of the stop mechanism 18 with respect to piston untit 22. The closer mechanism 18 is to the piston unit 22, the less water that will be introduced into compartment 38 from compartment 36 prior to venting of compartment 38 to the atmosphere. Suitable marks may be provided on the outer surface of upper portion 40b of body 40 to facilitate location of the exact point at which the plug 190 should be disposed relative to body 40 in order to effect dispensing of a predetermined amount of carbonated water from apparatus 10. The lower circular edge of cap 192 is aligned with one of the markings on portion 40b of body 40 to provide an exact amount of liquid for the particular drink being vended.

Assuming next that a customer desires to obtain a carbonated drink of low carbonation, an appropriate indicator will be provided on the door of the machine cabinet in association with the selector button 246 so that upon pressing of this selector button, a drink of proper carbonation will be delivered to such customer. The operation of apparatus 10 in delivering carbonated water of low carbonation is illustrated in FIGS. 16 to 20 inclusive. The stand-by condition of the apparatus is shown in FIG. 16 and thus assuming that the customer depresses selector button 246, and after deposit of proper coinage to effect closing of switch 256 as previously described, the cam motor 308 will be energized through the circuit previously traced upon closing of switch 311. Energization of the relay 332 causes the carbon dioxide control solenoid 362 to be energized thereby opening the valve in line E to permit carbon dioxide to flow into compartment 38 of cylinder 20. The water solenoid 162 is energized upon depression of selector button 246 from the closed switch 270, through the circuit previously traced, but passing from switch arm 348 which has been moved into engagement with contact 356 upon energization of coil 334, and thence through line 360, line 358, the coil 322, and the line connecting the coil to line 312. When the control valve associated with solenoid 162 is opened as shown in FIG. 17, a certain amount of the water passing downwardly through line B from line A is permitted to flow through line C and thence through line D into the interior of compartment 38. As is apparent from FIGS. 4 and 7, the high pressure water passing into bore 164 is prevented from flowing into bore 94 by shifting a ball 136 into closed disposition whereby the water is diverted into passage 172. The amount of water which is diverted into compartment 38 via lines C and D and in by-passing relationship to conduit B, is determined by the setting of the adjustable screw valve 182 in block 68. Also, the by-pass water flows past the check valve presented by ball 188 and thence into the carbonating compartment 38. The by-pass water from lines C and D effects a dilution of the carbonated water in compartment 38 since such by-pass water is not subjected to the gas within mixing member 118 which effects substantial dissolving of the carbon dioxide in water prior to entrance of the mixture into compartment 38 as set forth.

When the piston unit 22 reaches the uppermost end of its path of travel as shown in FIG. 18, the valve 54 is again opened to exhaust compartment 38 to the atmosphere and thereby effecting discharge of low carbonated water from compartment 38 via tube 96 and along the path F as shown in FIG. 19. During the downward movement of piston unit 22, the compartment 36 is again filled with water from tank 384 through line A. The final disposition of the piston unit 22 upon completion of discharge of low carbonated water from compartment 38 is shown in FIG. 20. The $CO_2$ limit switch 224 opens when the piston unit 22 reaches the upper end of its path of travel thereby deenergizing relay 332, and return of the water switch 316 to the initial condition thereof deenergizes the water solenoid 162 to close the valve in line C.

Dispensing of plain water to a cup at the filling station of the machine is illustrated in FIGS. 21 and 22 and with water passing through lines A, B and C to discharge line F in complete by-passing relationship to the cylinder 20. This type of operation is represented by depression of selector switch 244 of FIG. 24 and wherein the front panel of the machine will have suitable indication thereon adjacent button 244 to indicate that a noncarbonated drink will be obtained by actuation of this selector button.

When the customer depresses selector button 244 to close switches 266 and 311, the cam motor 308 is energized via line 310 and assuming that proper coinage has been deposited to close switch 256, whereby the switches 316 and 318 are again shifted by the cams on the shaft of motor 308. The switch arm 298 of selector switch 288 is in engagement with the plain water contact 290 of switch 288 whereby the solenoid 162 is energized through a path from switch 266 including line 300, switch arm 298, contact 290 of switch 288, line 372, line 326, contact 324, switch arm 320, line 358, coil 322 and the line connecting solenoid 162 to line 312. Since the valve in line C as shown in FIG. 22 is opened, while the valve in line E is maintained in a closed condition because of failure of the solenoid 362 to be energized, water flows through line C to the discharge path F and past the flow responsive check valve 136 for delivery directly into the cup at the dispensing station. As previously noted, the spring 138 maintains the check valve ball 136 out of engagement with the valve seat 128b until sudden pressure exceeding a predetermined value is placed on the ball valve, and thus water flows past check valve 136 into bore 94 for discharge through tube 96, under the conditions of operation just described for delivery of plain water to the cup. As previously explained, the head pressure of water in tank 384 is very small and therefore such pressure is not sufficient to overcome the bias of spring 138 which would effect closing of ball valve 136. As soon as the cam motor 308 has completed its predetermined cycle, the switch 316 will be opened thereby discontinuing flow of water to the cup as the solenoid 162 is deenergized.

It is now apparent that apparatus 10 is uniquely adapted to dispense not only highly carbonated but also low carbonated and plain water to the dispensing station of a vending machine, and with each quantity of water containing a specific degree of carbonation that may be readily and exactly controlled. By virtue of the fact that each cup volume of liquid is carbonated during the dispensing cycle of a respective drink, there is no tendency to under-carbonate or over-carbonate the liquid as has been the case with prior units wherein relatively large volumes of liquid were carbonated and then selected amounts thereof dispensed to a cup at the vending station. The apparatus operates at relatively low, safe pressures and eliminates expensive and difficultly sealed components as has been required in other types of carbonating mechanism.

Having thus described the invention what is claimed as new and desired to be secured by Letters Patent is:

1. In apparatus for preparing carbonated water:

structure having a liquid receiving chamber therein;

shiftable means in the chamber dividing the latter into a pair of separate compartments and initially located in a first position at one end of the path of travel thereof, the effective volume of one of the compartments being decreased and the effective volume of the other compartment being increased as the shiftable means is shifted toward a second position at the opposite end of its path of travel;

means connected to said structure for supplying uncarbonated water to said one compartment only as the shiftable means is shifted from said second position toward the first position of the same;

means on the structure externally of the chamber defining a liquid conduit communicating said one compartment with the other compartment for flow of water therethrough;

carbon dioxide delivery means connected to said liquid conduit adjacent said other compartment for supplying pressurized carbon dioxide to said other compartment under a pressure to shift the shiftable means;

control means disposed on said carbon dioxide delivery means and selectively operable to release carbon dioxide into said liquid conduit for mixture with water therein, the effective surface area of said shiftable means facing said one compartment being less than the corresponding effective surface area thereof facing the other compartment whereby said one compartment normally contains a supply of uncarbonated water, and upon operation of the selectively operable means disposed on said carbon dioxide delivery means to release said pressurized carbon dioxide into said liquid conduit and thereby effect shifting of the shiftable means toward said second position thereof, the water in said one compartment is displaced therefrom by said shiftable means and forced into said other compartment via said conduit means for mixing with the carbon dioxide and thus producing carbonated water in said other compartment;

liquid bypass means on the structure communicating said other compartment with the liquid conduit means in bypassing relationship to said carbon dioxide delivery means, and selectively operable control means disposed on said bypass means for permitting selective control of flow of a portion of the uncarbonated water from said one compartment directly into said other compartment; and means for discharging carbonated water from said other compartment after displacement of a preselected amount of water from said one compartment into the other compartment whereby the shiftable means is then caused to return to the initial position thereof by the refilling of the one compartment with uncarbonated water.

2. Apparatus as set forth in claim 1, wherein is provided a preadjustable valve in said liquid bypass means for regulating the portion of uncarbonated water permitted to flow directly into said other compartment when said selectively operable carbon dioxide control means and said selectively operable bypass control means are both operated whereby to control the degree of carbonation of the carbonated water in said other compartment.

3. Apparatus for preparing and discharging water having controlled amounts of carbonation comprising:

structure having an upright liquid receiving chamber therein;

vertically shiftable means in the chamber dividing the latter into separate upper and lower compartments with the shiftable means initially being located in a position at the lower end of its path of travel and of imperforate construction between compartments to prevent flow of liquid therebetween through the shiftable means, the effective volume of the upper compartment being decreased and the effective volume of the lower compartment being increased as the shiftable means is shifted toward the upper end of its path of travel;

means on the structure externally of the chamber defining a liquid conduit for communicating said upper compartment with the lower compartment;

water supply means coupled to said liquid conduit for supplying uncarbonated water under gravity head to said upper compartment only as the shiftable means is shifted from said upper position thereof toward said lower position of the same;

carbon dioxide delivery means connected to the liquid conduit means adjacent the lower compartment for supplying pressurized carbon dioxide to said lower compartment under a pressure to shift the shiftable means;

control valve means disposed on said carbon dioxide delivery means and selectively operable to release carbon dioxide into said conduit means for mixture with water therein, the effective surface area of said shiftable means facing said upper compartment being less than the corresponding effective surface area thereof facing the lower compartment whereby said upper compartment normally contains a supply of uncarbonated water, and upon operation of the selectively operable means disposed on said carbon dioxide delivery means to release said pressurized carbon dioxide into said lower compartment via the conduit means and thereby effecting shifting of the shiftable means toward said second position thereof, water in said upper compartment is displaced therefrom by said shiftable means and forced into said lower compartment via said conduit defining means in conjunction with mixing thereof with carbon dioxide to produce said carbonated water;

check valve means in said water supply means to preclude flow of water into said water supply means during passage of water from said upper compartment to the lower compartment through said conduit means;

means on the structure for discharging carbonated water from said lower compartment after a predetermined amount of water has been directed into said lower compartment whereby the shiftable means is then caused to return to the initial position thereof by the refilling of the upper compartment with uncarbonated water; and passage means communicating the conduit means with said carbonated water discharge means to permit selective direction of plain water to the water discharge means from said water supply means and in bypassing relationship to said chamber.

4. Apparatus as set forth in claim 3, wherein said passage means is provided with normally open flow responsive valve means therein for effecting closing of the passage means only when the pressure of the liquid in said passage means reaches a predetermined high level because of operation of said carbon dioxide control valve means.

5. Apparatus as set forth in claim 3, wherein is provided bypass means on the structure communicating said lower compartment with the conduit means upstream of the zone of intercommunication of the carbon dioxide supply means and said conduit means, selectively operable control means disposed on said bypass means for permitting selective control of flow of liquid therethrough, said passage means intercommunicating the bypass means, downstream of the control means disposed thereon, with said water discharge means, and normally open flow responsive valve means in said passage means for closing the passage means when the pressure of the liquid therein reaches a predetermined high value whereby liquid under high pressure is directed into said lower compartment via said bypass means and precluded from passing into the discharge means by closing of said flow responsive valve means when the shiftable means is shifted during a selective operation of both of said control means disposed on conduit defining means and said by-pass means respectively, said water supply means being connected to said conduit means whereby operation of only the selectively operable means disposed on said by-pass means effects discharge of plain water through said discharge means as water flows from the conduit means through said normally open flow responsive valve means of the passage means on said structure.

6. Apparatus for preparing and discharging water having controlled amounts of carbonation comprising:
structure having a liquid receiving, generally cylindrical, upright closed chamber therein;
a piston unit including means to shiftably position said unit in the chamber, movable between the upper and lower extremities of the chamber and said piston unit dividing the latter into upper and lower compartments, said piston unit initially being located at one end of the path of travel thereof adjacent the lower extremity of the chamber whereby the upper compartment has a substantially greater initial volume than the lower compartment;
means on the structure externally of the chamber defining a liquid conduit communicating said upper compartment with the lower compartment at opposed upper and lower extremities of the chamber;
water supply means coupled to said conduit means adjacent the upper extremity of the chamber for supplying water to said upper compartment only as the piston unit is shifted from a position adjacent the upper extremity of the chamber toward the initial position thereof;
carbon dioxide delivery means connected to said conduit means adjacent said lower extremity of the chamber and thereby said lower compartment for supplying pressurized carbon dioxide thereto under a pressure to shift the shiftable means;
control valve means disposed on said carbon dioxide delivery means and selectively operable to release carbon dioxide into said conduit means for mixture with water therein, said piston unit including a main piston body defining an impenetrable fluid barrier between the upper and lower compartments and spanning the chamber, and a stem section of substantial cross-sectional area and extending through said upper compartment and out of the structure to thereby cause the effective surface area of the piston body facing said upper compartment to be substantially less than the corresponding effective surface area of the piston body facing the lower compartment whereby said upper compartment normally contains a supply of uncarbonated water and upon operation of the selectively operable means disposed on said carbon dioxide means to release said pressurized carbon dioxide into said lower compartment via the conduit means and thereby effect shifting of the piston unit toward the uppermost end of its path of travel adjacent the upper extremity of the chamber, the water in said upper compartment is displaced therefrom by said piston body and forced into said lower compartment via said conduit defining means in conjunction with mixing thereof with carbon dioxide to provide said carbonated water; said piston body and the stem section thereof are provided with a longitudinally extending bore therein to communicate said lower compartment with the atmosphere;
means carried by the piston unit and communicating with the atmosphere for relieving the pressure on said lower compartment after a predetermined amount of water and carbon dioxide have been directed into said lower compartment, said relief means comprising an elongated rod member shiftably mounted in said bore and projecting outwardly from the extremity of said piston unit extending from said chamber, a valve element on the opposite end of said rod member adapted to engage the piston body in closing relationship to said bore, means engaging the rod member for biasing the valve element into the closed position of the same, and stop means on the structure positioned to be engaged by said rod member during shifting of the piston unit from the initial position thereof for moving the valve element out of closing relationship to said bore through the piston unit, after the latter has been shifted a predetermined distance along said path of travel thereof, said stop means including first and second spaced blocking means located along an extension of the axis of the piston unit and operative to limit movement of the rod member to a first distance and a second greater distance respectively, and selectively actuatable means operably coupled to the first blocking means for moving the latter to an inoperative position whereby the rod member is not shifted to relieve the pressure in said lower compartment until movement of the rod member is stopped by the second blocking means and thus permitting selective variation of the volume of carbonated water released from the lower compartment; and
valve controlled means on the structure communicating with said lower compartment and operable when the shiftable means approaches the upper end of its path of travel to discharge carbonated water from the lower compartment after relief of pressure therein whereby the piston unit is then caused to return to the initial position thereof by the refilling of the upper compartment with uncarbonated water.

7. Apparatus as set forth in claim 6, wherein said second blocking means is preadjustable along an extension of the axis of the piston unit to permit variation of the distance through which said piston is shifted before movement of said rod member is stopped by said second blocking means to effect relief of pressure in said lower compartment.

8. Apparatus as set forth in claim 6, wherein is provided means coupled to said selectively operable means associated with said carbon dioxide supply means and operable by said rod member to discontinue supply of carbon dioxide to said lower compartment before relief of pressure in said lower compartment.

9. Apparatus as set forth in claim 6, wherein is provided means in said conduit means adjacent the zone of juncture thereof with said carbon dioxide delivery means for effecting direction of a plurality of streams of water into the gas entering the conduit means from said carbon dioxide supply means to increase the dissolution of the carbon dioxide in the water.

10. Apparatus as set forth in claim 6, wherein said stop means includes a second elongated rod member reciprocably mounted above the first rod member, normally spaced from the latter and movable upon engagement therewith by the second rod member, spring means normally biasing the second rod member toward the first rod member and means operated by said second rod member upon shifting thereof by the first rod member during upward movement of the piston unit, to discontinue supply of carbon dioxide to the conduit means, and abutment means positioned to be engaged by said second rod member during movement of the latter and said first rod member by said piston unit for interrupting shifting of the rod members during continued movement of the piston unit to effect unseating of said valve element and thereby relief of pressure in said lower compartment.

11. Apparatus for preparing and discharging water having controlled amounts of carbonation comprising:
   structure having a liquid receiving chamber therein;
   shiftable means in the chamber dividing the latter into a pair of separate compartments and initially located in a first position at one end of the path of travel thereof, the effective volume of one of the compartments being decreased and the effective volume of the other compartment being increased as the shiftable means is shifted toward a second position at the opposite end of its path of travel;
   means connected to said structure for supplying uncarbonated water to said one compartment only as the shiftable means is shifted from said second position toward the first position of the same;
   means on the structure externally of the chamber defining a liquid conduit communicating said one compartment with the other compartment;
   carbon dioxide delivery means connected to said conduit means adjacent the other compartment for supplying pressurized carbon dioxide to said other compartment under a pressure to shift the shiftable means;
   control means disposed on said carbon dioxide delivery means and selectively operable to release carbon dioxide into said conduit means for mixture with water therein, the effective surface area of said shiftable means facing said one compartment being less than the corresponding effective surface area thereof facing the other compartment whereby said one compartment normally contains a supply of uncarbonated water and upon operation of the selectively operable means disposed on said carbon dioxide delivery means to release said pressurized carbon dioxide into said other compartment via the conduit means and thereby effect shifting of the shiftable means toward said second position thereof, the water in said one compartment is displaced therefrom by said shiftable means and forced into said other compartment via said conduit means for mixing with the carbon dioxide, said structure being provided with liquid bypass means therein communicating said other compartment with the conduit defining means;
   selectively operable control means in said bypass means for permitting selective control of liquid flow therethrough; and
   means for discharging carbonated water from said other compartment after displacement of a preselected amount of water from said one compartment into the other compartment whereby the shiftable means is then caused to return to the initial position thereof by the refilling of the one compartment with uncarbonated water.

References Cited by the Examiner

UNITED STATES PATENTS

| | | | |
|---|---|---|---|
| 608,158 | 7/1898 | Painter | 222—438 X |
| 715,658 | 12/1902 | Hampson et al. | |
| 847,552 | 3/1907 | Carlson | 261—111 |
| 2,497,741 | 2/1950 | Quimper. | |
| 2,643,866 | 6/1953 | Kollsman | 261—76 |
| 2,776,074 | 1/1957 | St. Laurence | 222—129.4 X |
| 3,109,873 | 11/1963 | Hotchkiss | 261—35 |

HARRY B. THORNTON, *Primary Examiner.*
HERBERT L. MARTIN, *Examiner.*